Figure 1:
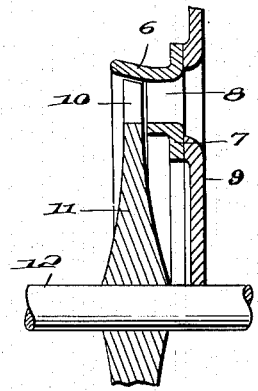

Aug. 19, 1941.   W. VAN RIJSWIJK   2,252,817
NOZZLE CONSTRUCTION FOR HIGH TEMPERATURE TURBINES
Filed Oct. 12, 1938

Inventor:
Willem van Rijswijk,
By Potter, Pierce + Scheffler,
Attorneys.

Patented Aug. 19, 1941

2,252,817

UNITED STATES PATENT OFFICE 2,252,817

NOZZLE CONSTRUCTION FOR HIGH TEMPERATURE TURBINES

Willem van Rijswijk, Baden, Switzerland, assignor to Aktiengesellschaft Brown, Boveri & Cie, Baden, Switzerland, a joint-stock company Application October 12, 1938, Serial No. 234,687
In Germany November 1, 1937

8 Claims. (Cl. 253—78)

The present invention relates to nozzle constructions for turbines and especially to nozzles for turbines employing high temperature steam or gases as the motive fluid.

Nozzle bodies which conduct or guide the motive fluid to the turbine wheels in high temperature steam or gas turbines are subjected to extremely high temperatures and also quick fluctuations in temperature. In prior nozzle constructions, it has been the practice to form the nozzle of two comparatively massive concentric rings providing an annular nozzles opening with a plurality of guide vanes supported in the opening between the two rings and rigidly secured to each of them either by being cast integrally therewith or by other suitable securing means.

Due to the high temperatures encountered and especially the great fluctuations in temperature in operation, distortion and buckling of the guide vanes has been a constantly recurring problem. This distortion, applicant has found, occurs due to the fact that the guide vanes, being comparatively thin and directly exposed to the hot motive fluid, heat up quickly, whereas, the massive ring members between which the vanes are mounted, heat up slowly and are in fact cooled by contact with cooler parts of the casing of the turbine on which they are mounted. This uneven heating and consequent unequal expansion between the guide vanes and the massive ring members often resulted in permanent distortion of the vanes since they have little strength at high temperatures.

The object of the present invention is to provide an improved turbine nozzle construction which will eliminate the drawbacks of prior constructions and prevent buckling and distortion of the guide vanes.

Another object of the invention is to provide an improved turbine nozzle construction in which the guide vanes are permitted free expansion and contraction irrespective of the rate of expansion and contraction of the other parts of the nozzle.

A further object of the invention is to provide an improved turbine nozzle construction comprising concentric heavy ring members providing an annular nozzle opening with guide vanes rigidly connected to one only of said ring members and terminating short of the other and a thin band or cover member bridging over the spaces between the free ends of the blades to define one circumferential wall of the nozzle passage.

A still further object of the invention is to provide a turbine and nozzle construction according to the preceding paragraph in which the guide vanes are mounted on the inner ring member and in which the outer ring member is constructed with a portion providing the outer casing of the rotor blades of the turbine.

Other objects and advantages of the invention will become apparent during the course of the following detailed description and upon reference to the accompanying drawing which illustrates preferred constructional embodiments of the invention.

Figure 2:
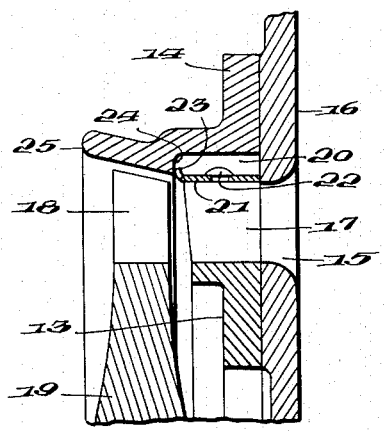
Figure 3:
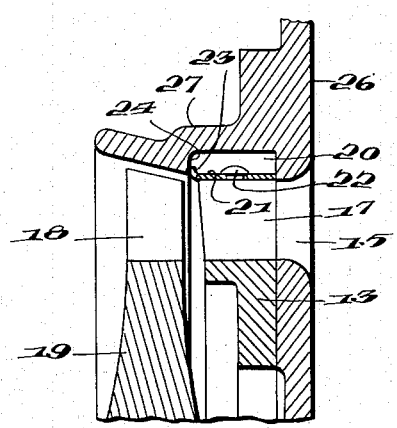
Figure 4:
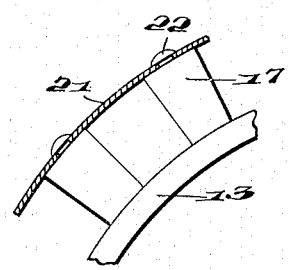
Figure 5:
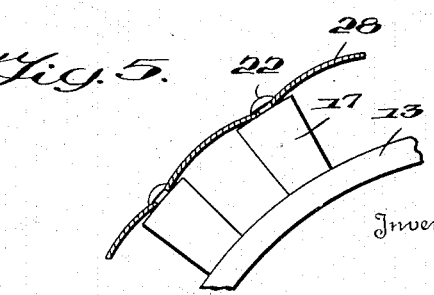

In the drawing,

Fig. 1 is a partial sectional view through a turbine illustrating the prior art practice, Fig. 2 is a partial sectional view through a turbine illustrating a preferred embodiment of the invention, Fig. 3 is a similar view illustrating a modification, Fig. 4 is a fragmentary view, partially in section, illustrating a detail, and, Fig. 5 is a similar view, illustrating a modification.

Referring more particularly to the drawing, Fig. 1 is illustrative of a well known type of nozzle construction in which the nozzle defining rings 6 and 7 are formed as an integral casting with the guide vanes 8. A part of the casing is indicated at 9 against which the nozzle is mounted in advance of the blades 10 of the rotor 11 mounted on shaft 12.

From an inspection of Fig. 1, the drawbacks of this prior construction are apparent. The guide vanes 8 which are directly in the path of the hot motive fluid will heat up and expand much more quickly than the ring members 6 and 7 which are integral therewith and this differential is accentuated by the fact that the rings 6 and 7 are in contact with cooler parts of the casing. Since the heavy rings prevent longitudinal expansion of the vanes, distortion of these naturally follows.

Referring now to Fig. 2, which illustrates the improved construction according to the invention, the turbine nozzle is made up of concentric annular ring members 13 and 14 providing an annular nozzle passage therebetween which is in alignment with a passage 15 in a casing part 16 through which the motive fluid is conducted to the nozzle.

The inner nozzle ring 13 carries a plurality of guide vanes 17 which direct the motive fluid to the rotor blades 18 carried by the rotor body 19. The guide vanes 17 are rigidly mounted on the ring 13 and may be cast or otherwise formed integrally therewith. The blades 17 may also be welded or riveted to the ring 13. The outer ends of the vanes 17 terminate short of the inner surface of the ring section 14, and the latter is preferably provided with a recess 20 to provide ample clearance space for expansion of said vanes.

The spaces between the free ends of the guide vanes are bridged by an expansible cover plate or band 21 which serves to define the outer wall of the nozzle passage and guides the motive fluid through the vanes. The cover plate 21 is in the form of a thin metal band substantially equal to or slightly greater in width than the depth across the vanes and is secured to each of the vanes by means of rivets or headed studs 22. The invention also contemplates the welding of the metal band to the guide vanes. The confining ring cover plate 21 is further held against axial movement by means of upturned lips 23 along one side thereof which lips rest against a shoulder 24 of the ring 14 which is provided by the formation of the recess 20.

The ring member 14 is provided with a slanting flange portion 25 which forms the outer casing wall surrounding the rotor 19 and being separate from the other nozzle parts, the ring 14 is accurately centered with respect to the axis of the rotor blades so as to provide proper clearance between the blades and wall portion 25.

In the operation of the improved construction it will be obvious that the thin cover plate 21 and the guide vanes 17 will both be quickly heated and free to expand under the influence of the hot motive fluid and that the band will also be free to flex and stretch to accommodate for the expansion of the guide vanes.

In the modified form of the invention shown in Fig. 3, the structure is the same as that described in connection with Fig. 2, except that the turbine casing 26 is formed with an integral flange ring 27 corresponding to the separate nozzle ring member 14 of Fig. 2. Otherwise the construction is the same as that illustrated in Fig. 2 and corresponding reference numerals are used to indicate the same parts as in Fig. 2.

In the modification of the invention shown in Fig. 5, the metal band 28, which corresponds to the band 21 of Fig. 1, is formed with arched portions between the respective guide vanes 17. The arched portions of the band 28 provide added latitude for the radial expansion of the guide vanes. In some cases it may be desirable to form the band around the outer ends of the guide vanes of a plurality of plates capable of relative movement with respect to each other, instead of forming the same as a continuous strip.

While preferred embodiments of the invention have been shown and described by way of illustration, it will be understood that various other modifications of the invention and changes in the details of construction may be resorted to without departing from the spirit of the invention within the scope of the appended claims.

1. Turbine nozzle construction comprising two concentric annular ring members in radially spaced relation, a plurality of guide vanes rigidly mounted peripherally of the inner ring member, the outer ring member having an annular recess in its inner surface providing clearance space between the ring and the outer ends of said guide vanes, and a thin metal cover plate member disposed in and extending across said recess, said cover plate being secured to and bridging the outer ends of said guide vanes.

2. Turbine nozzle construction comprising two concentric annular ring members in radially spaced relation, a plurality of guide vanes rigidly mounted peripherally of the inner ring member, the outer ring member having an annular recess in its inner surface providing clearance space between the ring and the outer ends of said guide vanes, and a thin metal band encircling and secured to the outer ends of said guide vanes and axially bridging the recess in said outer ring member.

3. Turbine nozzle construction comprising two concentric annular ring members in radially spaced relation, a plurality of guide vanes rigidly mounted peripherally of the inner ring member, the outer ring member having an annular recess in its inner surface providing clearance space between the ring and the outer ends of said guide vanes, said outer ring member having a substantially axially extending wall portion beyond said recess and forming the outer casing part for the rotor vanes of the turbine, and a thin metal band encircling and secured to the outer ends of said guide vanes and axially bridging the recess in said outer ring member.

4. Turbine nozzle according to claim 3, said outer ring member being formed as an integral part of the casing of the turbine.

5. In a nozzle construction for high temperature turbines, a stationary casing wall having a motive fluid admission opening therein, two concentric stationary annular ring members adjacent said casing wall disposed in radially spaced relation to define a nozzle passage leading from said admission opening, a plurality of circumferentially spaced radially disposed guide vanes mounted peripherally of the inner annular ring member and terminating short of contact with the outer annular ring member, and a thin metal cover plate secured to and bridging the free ends of said guide vanes, said cover plate being substantially flat in axial section and extending from said casing wall axially across the ends of said guide vanes to confine the flow of motive fluid through the nozzle.

6. In a nozzle construction for high temperature turbines, a stationary casing wall having a motive fluid admission opening therein, two concentric stationary annular ring members adjacent said casing wall disposed in radially spaced relation to define a nozzle passage leading from said admission opening, a plurality of circumferentially spaced radially disposed guide vanes mounted peripherally of the inner annular ring member and terminating short of contact with the outer annular ring member, and a thin metal cover plate secured to and bridging the free ends of said guide vanes, said outer annular ring member having an internal annular shoulder spaced from said casing wall, and said cover plate being substantially flat in axial section and extending from said casing wall axially across the ends of said guide vanes to said annular shoulder on said outer ring member.

7. A nozzle construction according to claim 5 in which said cover plate comprises an annular band encircling the free ends of said guide vanes.

8. A nozzle construction according to claim 6 in which said cover plate comprises an annular band encircling the free ends of said guide vanes.

WILLEM VAN RIJSWIJK.